Patented Apr. 1, 1930

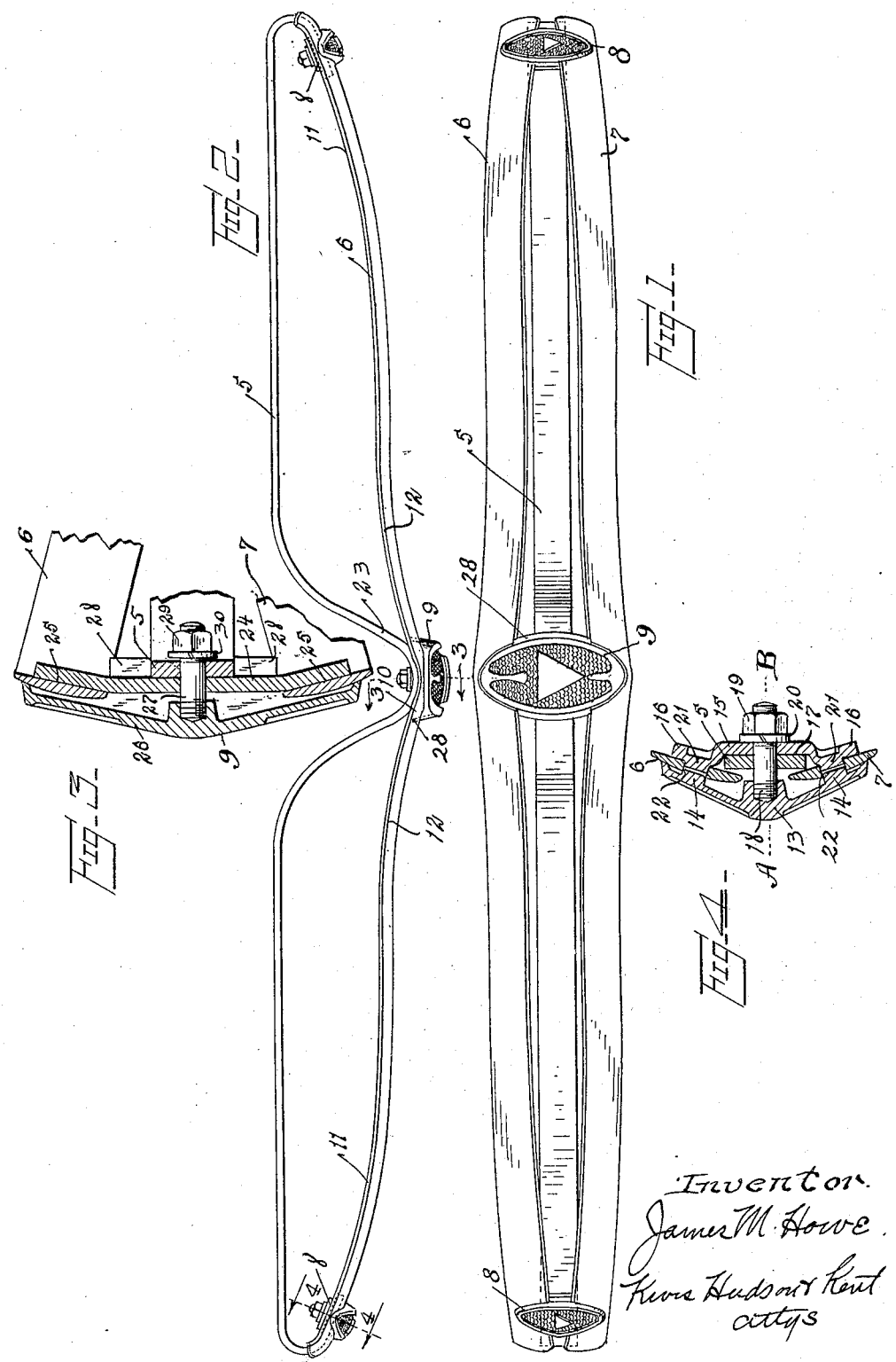

1,752,381

UNITED STATES PATENT OFFICE

JAMES M. HOWE, OF CLEVELAND, OHIO, ASSIGNOR TO THE EATON AXLE & SPRING COMPANY, OF CLEVELAND, OHIO, A CORPORATION OF OHIO

AUTOMOBILE BUMPER

Application filed October 27, 1928. Serial No. 315,483.

This invention relates to automobile bumpers and more particularly to automobile bumpers of the flexible bar type.

An object of this invention is to provide a bumper having impact bars, which have been bent in one plane only, assembled so as to have the appearance of impact bars which have been bent in two planes.

Another object of this invention is to provide a bumper having bent impact bars, assembled in such position as to have the appearance of impact bars which have been bent edgewise.

Still another object of this invention is to provide for manufacture at low cost, a bumper which, in appearance, closely resembles a bumper employing impact bars bent in two planes.

A further object of this invention is to provide a bumper having impact bars, bent in one plane only, assembled in such position so as to provide a wider impact surface centrally of the bumper than at its ends.

Another object of this invention is to provide an improved form of clamp for holding and supporting impact bars in proper position.

With the above and other objects in view the invention may be said to comprise the bumper illustrated in the accompanying drawings, hereinafter described, and particularly set forth in the appended claims, together with such variations and modifications thereof as will be apparent to one skilled in the art to which the invention appertains.

Reference should be had to the accompanying drawings forming a part of this specification in which:

Fig. 1 is a front elevational view of the bumper;

Fig. 2 is a top plan view thereof;

Fig. 3 is a sectional view taken on line 3—3 of Fig. 2; and

Fig. 4 is a sectional view taken on line 4—4 of Fig. 2.

The bumper of the present invention is of the flexible bar type designed to be attached to the frame of an automobile for the purpose of protecting the automobile from damage. As shown in the drawing, the bumper comprises a supporting bar 5, adapted to be attached to the frame of an automobile, and spaced impact bars 6 and 7 secured to supporting bar 5 as by means of end clamps 8 and a center clamp 9.

The impact bars are exactly alike, and may be formed from bars of spring steel, of suitable cross-sectional shape, by bending or curving the stock in one plane only, that is, in the plane which passes through the bar and includes the minor axis of its cross-section, and which includes the longitudinal axis of the bar. The impact bars 6 and 7, shown in the drawings, are formed from bars of flat stock which have been bent in one plane only to provide each bar with a central forwardly extending bend 10, a forwardly extending bend 11 adjacent the ends of the bars and a reverse or rearwardly extending bend 12 connecting central bend 10 with end bends 11. As a convenient means for holding the impact bars 6 and 7 in proper position and for securing these bars to supporting bar 5, I provide end clamps 8, which are of an improved form. These end clamps 8 comprise a front plate 13 having spaced lugs 14 formed on the rear surface thereof, and a clamping member 15 bent to provide oppositely inclined end portions 16 and a central recessed portion 17 in which supporting bar 5 is received. From plate 13 a stud 18 projects rearwardly through supporting bar 5 and clamping member 15 and is provided with a nut 19 and lock washer 20 for drawing the parts together. Lugs 21 are formed on inclined end portions 16, preferably by laterally displacing a slug of metal by the application of a shearing force. Adjacent each end of impact bars 6 and 7 a perforation 22 is provided in which lugs 14 and 21 engage when the impact bars are held between front plate 13 and clamping member 15. When assembled as shown in the drawings, impact bars 6 and 7 are held in spaced relation by end clamps 8, with bar 6 tilted upwardly from the horizontal plane represented by line A—B, and bar 7 tilted downwardly from this horizontal plane. By thus tilting the impact bars the vertical spacing of the bars is made greater at their center than at their ends, thereby providing an impact surface which is wider centrally of the bumper than at its ends. Furthermore, with the impact bars thus held in vertically spaced tilted relation, the portions of the bars comprising the forwardly extending bends 10 and 11, appear as portions oppositely arched with respect to the horizontal plane when the bumper is viewed from the front, whereby these bars which have actually been bent in one plane only, closely resemble impact bars which have been bent in two planes.

It may be desirable to secure supporting bar 5 and impact bars 6 and 7 together centrally of the bumper. To accomplish this end, I have shown supporting bar 5 formed with a central forwardly extending bend 23 which supports the center clamp 9. This center clamp, as shown in Fig. 3, comprises a clamping member 24 having inclined end portions 25, and a front plate 26 carrying a stud 27 which projects rearwardly through clamping member 24 and supporting bar 5. When in assembled position, impact bars 6 and 7 bear against inclined end portions 25, while projection 28 formed integral with plate 26 extends between the bars. Stud 27 is provided with a nut 29 and lock-washer 30 by means of which clamping member 24 and plate 26 are drawn together so as to engage the impact bars and thus assist end clamps 8 in holding these bars in tilted vertically spaced position.

It will now be readily apparent that when the bumper is viewed from the front, as shown in Fig. 1, the forwardly extending bends of the tilted impact bars appear as a plurality of portions oppositely arched with respect to the horizontal plane, and that in appearance the bumper closely resembles a bumper having edge-bent impact bars.

While I have shown and described the preferred embodiment of my invention, it will be understood that various changes and alterations may be made therein without departing from the spirit of the invention or the scope of the appended claims.

Having thus described my invention, I claim:

1. A bumper comprising a supporting bar and a plurality of impact bars secured to said supporting bar, one of said impact bars having alternate forwardly and rearwardly extending bends formed therein and being tilted upwardly from a horizontal plane whereby said bar appears to have a plurality of vertically arched portions when the bumper is viewed from the front.

2. A bumper comprising a supporting bar and a plurality of impact bars secured to said supporting bar, one of said impact bars having alternate forwardly and rearwardly extending bends formed therein and being tilted upwardly from a horizontal plane whereby said bar appears to have a plurality of vertically arched portions when the bumper is viewed from the front, and means for securing said bars together at the center of the bumper.

3. A bumper comprising a supporting bar and a plurality of impact bars secured to said supporting bar, said impact bars each having a plurality of forwardly extending bends, one of said impact bars being tilted upwardly and another tilted downwardly from a horizontal plane whereby said tilted bars appear to have a plurality of vertically opposed arched portions when the bumper is viewed from the front.

4. A bumper comprising a supporting bar and a plurality of impact bars secured to said supporting bar, said impact bars each having a plurality of forwardly extending bends, one of said impact bars being tilted upwardly and another tilted downwardly from a horizontal plane whereby said tilted bars appear to have a plurality of vertically opposed arched portions when the bumper is viewed from the front, and means for securing said bars together at the center of the bumper.

5. A bumper comprising a supporting bar, a plurality of impact bars each having a plurality of forwardly extending bends formed therein, said impact bars being secured to said supporting bar and held thereby in tilted position whereby said impact bars appear to have vertically spaced oppositely arched portions forming a wide impact surface at the center of the bumper and vertically spaced oppositely arched portions forming narrower impact surfaces at the ends of the bumper.

6. A bumper comprising a supporting bar, a plurality of impact bars each having a plurality of forwardly extending bends formed therein, said impact bars being secured to said supporting bar and held thereby in tilted position whereby said impact bars appear to have vertically spaced oppositely arched portions forming a wide impact surface at the center of the bumper and vertically spaced oppositely arched portions forming narrower impact surfaces at the ends of the bumper, and means for securing said bars together at the center of the bumper.

7. A bumper comprising a supporting bar and a plurality of impact bars secured to said supporting bar, said impact bars having alternate forwardly and rearwardly extending bends formed therein, said bars being tilted from a horizontal plane whereby the forwardly extending bends of said bars appear as portions oppositely arched with respect to said plane when the bumper is viewed from the front.

8. A bumper comprising a supporting bar and a plurality of impact bars secured to said supporting bar, said impact bars having alternate forwardly and rearwardly extending bends formed therein, said bars being tilted from a horizontal plane whereby the forwardly extending bends of said bars appear as portions oppositely arched with respect to said plane when the bumper is viewed from the front, and means for securing said bars together at the center of the bumper.

9. In a device for clamping parts in spaced relation, the combination of a plate having spaced lugs adapted to engage openings in said parts, a bar having spaced lugs adapted to engage said openings, and means for forcing said bar and said plate toward each other.

10. In a device for supporting parts in spaced relation, the combination of a supporting member, a plate having spaced lugs adapted to engage openings in said parts, a bar recessed to engage said supporting member and having spaced lugs adapted to engage said openings, and means for urging said bar and said plate toward each other.

11. In a device for supporting parts in tilted relation, the combination of a support, a bar carried by said support and having inclined end portions against which said parts bear, lugs on said end portions adapted to engage openings in said parts, a plate having spaced lugs adapted to engage said openings, and means for urging said bar and said plate toward each other.

12. In a device for supporting members in spaced tilted relation, the combination of a support, a bar carried by said support and having inclined end portions against which said members bear, a plate engaging said members and having portions extending therebetween, and means for urging said bar and said plate toward each other.

13. In a device for supporting members in spaced relation, the combination of a plate, a support, a bar having inclined end portions with lugs thereon adapted to engage in openings in said members, and means for urging said bar and said plate toward each other.

In testimony whereof, I hereunto affix my signature.

JAMES M. HOWE.